July 31, 1923.

C. F. MacGILL 1,463,534

FLUID REGISTERING MECHANISM

Filed Aug. 16, 1921

INVENTOR:
Charles F. MacGill
by Macleod, Calver, Copeland & Dike
Atty's.

Patented July 31, 1923.

1,463,534

UNITED STATES PATENT OFFICE.

CHARLES F. MacGILL, OF CAMBRIDGE, MASSACHUSETTS.

FLUID-REGISTERING MECHANISM.

Application filed August 16, 1921. Serial No. 492,819.

*To all whom it may concern:*

Be it known that I, CHARLES F. MACGILL, a citizen of the United States, residing at Cambridge, county of Middlesex, State of Massachusetts, have invented a certain new and useful Improvement in Fluid-Registering Mechanism, of which the following is a specification, reference being had therein to the accompanying drawings.

The invention relates to a new and useful improvement in fluid gauge mechanism for attachment to a container. The object of the invention is to provide two separate indicating means, one of which indicates the amount of fluid within the container at the beginning of a filling operation, and the other of which will indicate the fluid contents at the end of a filling operation, so that by observing the difference between the registration by the two indicating devices it will readily be seen how much fluid has been added to the container.

The invention is especially intended for application to a liquid fuel tank, such for instance as the fuel tank of an automobile, but is not limited to such use. It has been common heretofore to have an attachment controlled by a float to indicate the quantity of actual liquid contents of the tank at any particular time so as to determine how much fuel there is in the tank when the amount of fuel has reached such a low point as to require replenishing, but so far as I am aware there has not been heretofore any means by which there is at the same time indicated the amount in the container before the replenishing and the amount contained after the replenishing.

The invention will be fully understood from the following description when taken in connection with the accompanying drawings, and the novel features thereof will be pointed out and clearly defined in the claim at the close of this specification.

In the drawings, Fig. 1 is an elevation partly in section of a device embodying the invention attached to a container, a portion only of the top part of the container being shown.

Figure 1:
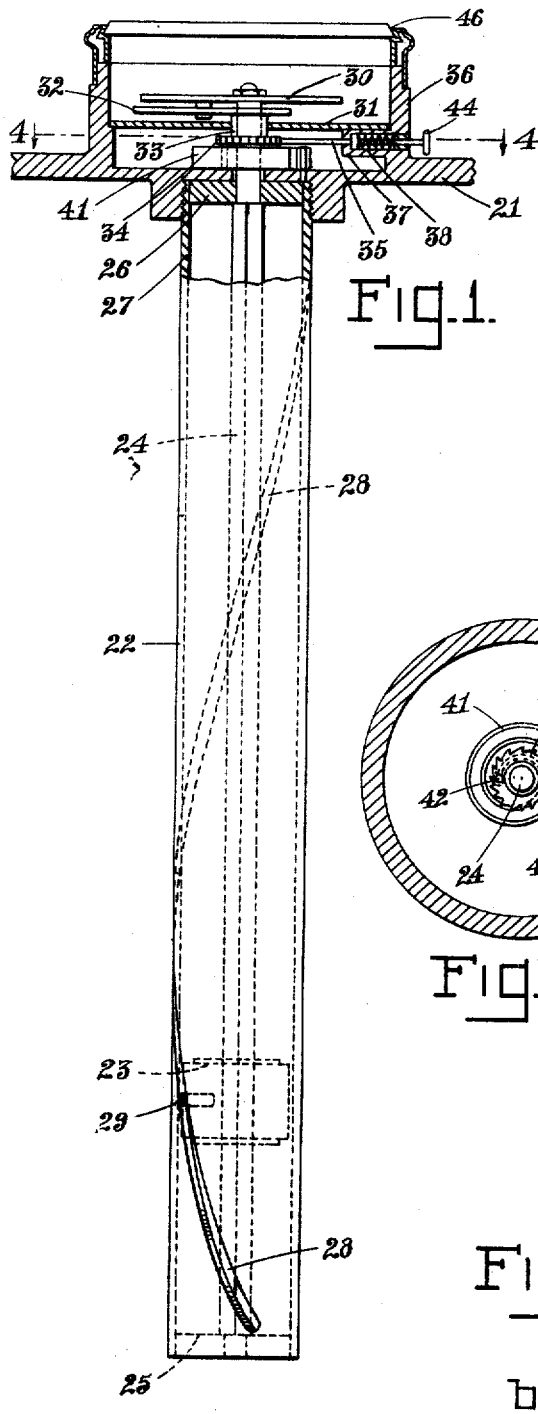

Referring now to the drawings, at 21 is shown a portion of the top of a fuel container, having attached thereto the cylinder 22 within which is a float 23. The cylinder is shown with its upper end screwed into the top of the tank. Its lower end extends down into the tank as usual, although the tank is not fully shown in the drawings.

The float 23 is slidably mounted on a rotatable rod or shaft 24. Said shaft 24 is noncircular, preferably square in cross section for the purpose to be hereinafter described. The lower end of the said shaft is formed with a reduced cylindrical portion which is journalled in a bearing member 25 attached to the lower end of the cylinder. The upper end of the shaft is also formed with a reduced cylindrical portion which is journalled in a bearing member 26 in the head 27 of the cylinder 22. The bearing member 25 for the lower end of the shaft serves also as a bottom rest for the float 23 when the contents of the tank are reduced enough to allow the float to come to the bottom.

The float is freely slidable on the shaft; the cylinder is formed with a spiral slot 28 which goes not more than once around the periphery of the cylinder. As shown it goes somewhat less than once around. A pin 29 projects from the float and engages with said slot 28.

As the float rises and falls it slides up and down on the shaft and at the same time it is rotated by reason of the engagement of the pin 29 with the spiral slot.

By reason of the noncircular contour of the shaft which passes loosely through the noncircular hole in the float the rotation of the float will cause the shaft also to rotate simultaneously therewith.

The upper end of the shaft 24 extends up through the upper bearing member 26 and carries at its upper end an index hand 30 which moves around with the rotation of the shaft.

A dial 31 is provided, which is properly marked with graduations to which the indicator will point as it moves around. The dial is properly graduated and marked so that as the float rises when the tank is being filled the hand 30 will indicate the number of gallons or other units of measure in the tank. In the drawings the device is shown as adapted to use with a 20 gallon tank.

A second index hand 32 is provided with a hub 33 which is also mounted on the shaft 24 but is loose thereon so that it does not necessarily rotate with the shaft. Carried by said hub and mounted fast thereon is a ratchet 34. A push pin 35 is slidably mounted in an aperture in the curbing 36 which rises above the container top 21 and surrounds the registering mechanism. A lug 37 projects radially inward from the inner periphery of the said curbing 36 and is formed with a socket 38 in which is contained a spring 39, one end of which bears against the shoulder at the outer end of the socket, and the other end of which bears against a collar 40 on the pin 35. The spring 39 normally retains the push pin 35 in engagement with the ratchet. A spiral spring 41 is coiled around the shaft 24, one end of said spring being made fast to the ratchet 34 at 42, and the other end being made fast to the housing or framework at 43.

Figure 2:
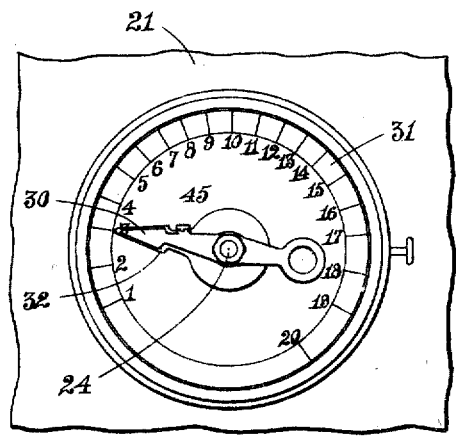
Fig. 2 is a plan view showing the two registering devices as they appear at the beginning of a filling operation.
Figure 4:
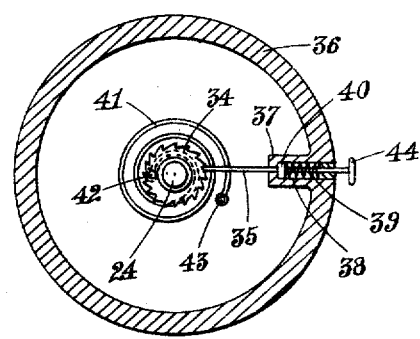
Fig. 4 is a sectional view showing the means for controlling the registering mechanism for the initial contents.

When the float 23 is at or near the lower end of the cylinder 22, which is the case when the tank is empty, or very nearly empty, and the hands 32 and 30 are both turned to indicate that there is no gasoline or only a small quantity of gasoline in the tank, the spring 41 is coiled up and under tension. At this time the pin 35 should be in engagement with the ratchet 34. Now if gasoline is poured into the tank while in this position the float will rise and therefore rotate shaft 24 and turn the hand 30 forward in clockwise direction, but the hand 32 will be held stationary by reason of the stop pin 35 engaging the ratchet, said ratchet being fast to the hub 35 which carries the hand 32. In Figure 2 of the drawings the two hands are both shown as pointing to the numeral 3 on the dial because as a rule the tank is replenished before the fuel is entirely exhausted.

Figure 3:
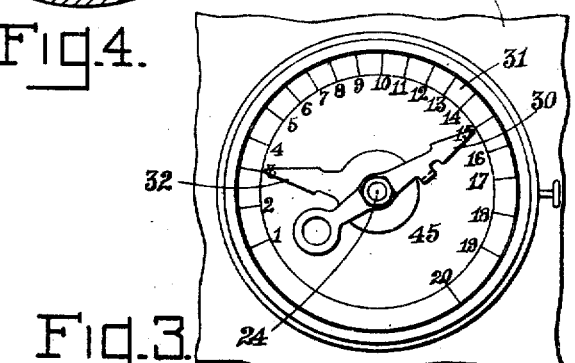
Fig. 3 is a plan view showing the position of the two registering devices after a certain amount of fluid has been added to the container.

For illustration of the operation we will therefore assume that the two hands are in the position shown in Figure 2 with both hands pointing to the numeral 3 on the dial 31. We will now assume that fuel is poured into the tank sufficient for the upper index hand 30 to swing around to the numeral 15, as shown in Figure 3. The hand 32 will still point to the numeral 3 on the dial and it is therefore made evident to the observer that there has been added to the tank an amount of fuel equal to the difference between 3 and 15, that is 12 gallons. After the observation has been made the person in control of the apparatus will pull out the stop pin 35 by means of the handle 44, thus releasing the stop pin from engagement with the ratchet and the spring 41 will uncoil and rotate the ratchet forward carrying with it the hand 32. The hand 30 is formed with a downwardly projecting finger 45 which will extend into the pathway of the hand 32, thus serving as a stop to prevent the hand 32 swinging past the position of the hand 30. As soon as the hand 32 has moved forward, the pin 35 should be released by the operator so that it will be pulled back by its spring 39 into engagement with the ratchet. Now as the gasoline is lowered in the tank as it is consumed by the engine, the said shaft 24 will rotate backward while the float descends, and this will cause the backward rotation of the hand 30 which will at all times indicate on the dial the amount still remaining in the tank. During the backward rotation of the hand 30, the said finger 45 by its engagement with the hand 32 will turn the hand 32 backward with it, has also the hub 33 and ratchet 34 the stop pin 35 riding on the inclined backs of the ratchet teeth, and in so doing the coil spring 41 will be wound up again. The two hands are thus kept together during the entire downward movement of the float. When both hands arrive at the numeral 3 on the dial, as shown in Figure 2, indicating that the contents have fallen to three gallons, if the tank is again filled, the pin 35, which has been thrown into engagement with the ratchet 34 by the spring 39 retains the said hand 32 still pointing to 3 while the hand 30 again moves forward to indicate the increased contents of the tank. At the end of the filling the top pin 35 should be again released and the spring 41 will cause the hub 32 to once more overtake the hand 30.

The curb 36 is provided with a cover having a glass top 46 through which the registrations can be read.

The index hands 30 and 32 should be enameled in different colors so as to be easily distinguishable from each other.

What I claim is:—

In a registering and indicating device for liquids, the combination with a liquid container, of a float-controlled rotary shaft extending into said container, a stationary dial above said container, an index hand carried by said shaft and movable over said dial to indicate the amount of liquid in the container at all times, a hub loosely surrounding said shaft and provided with a ratchet wheel, a second index hand carried by said hub and also movable over said dial, a spiral spring connected with said hub, a spring-pressed stop to hold said ratchet wheel and said second index hand stationary to indicate the amount of liquid in the container before a filling operation and while said first-named index hand is moved to indicate the amount of liquid supplied to said container at a filling operation, said spring, when said stop is released, served to move said second index hand to a position coinciding with the position of said first-named index hand, and means whereby said first-named index hand will move said second index hand with it against the stress of said spiral spring as liquid is withdrawn from said container.

In testimony whereof I affix my signature.

CHARLES F. MacGILL.